United States Patent
Lenk et al.

(10) Patent No.: US 10,041,401 B2
(45) Date of Patent: Aug. 7, 2018

(54) OVERRUN AIR RECIRCULATION VALVE FOR A COMPRESSOR OF AN INTERNAL COMBUSTION ENGINE

(71) Applicant: PIERBURG GMBH, Neuss (DE)

(72) Inventors: Martin Lenk, Neuss (DE); Daniel Mandjeralo, Duesseldorf (DE); Oliver Paul, Gelsenkirchen (DE); Helmut Schmitz, Rommerskirchen (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 15/511,643

(22) PCT Filed: Jul. 17, 2015

(86) PCT No.: PCT/EP2015/066454
§ 371 (c)(1),
(2) Date: Mar. 16, 2017

(87) PCT Pub. No.: WO2016/041660
PCT Pub. Date: Mar. 24, 2016

(65) Prior Publication Data
US 2017/0284285 A1    Oct. 5, 2017

(30) Foreign Application Priority Data

Sep. 19, 2014    (DE) .................. 10 2014 113 551

(51) Int. Cl.
*F02B 39/16*    (2006.01)
*F02B 33/44*    (2006.01)
(Continued)

(52) U.S. Cl.
CPC ............ *F02B 39/16* (2013.01); *F02B 33/44* (2013.01); *F02M 35/10157* (2013.01);
(Continued)

(58) Field of Classification Search
CPC ...... F02B 39/16; F02B 33/44; F16K 31/0675; F16K 31/0655; F02M 35/10157; F02M 35/10255
(Continued)

(56) References Cited

U.S. PATENT DOCUMENTS 4,627,596 A * 12/1986 Busacchi ............... F02M 3/075
251/129.07
7,757,873 B2    7/2010 Thiery et al.
(Continued)

FOREIGN PATENT DOCUMENTS

DE    10 2005 034 939 A1    2/2007
DE    10 2009 011 938 B3    9/2010
(Continued)

*Primary Examiner* — Eric Keasel
(74) *Attorney, Agent, or Firm* — Norman B. Thot

(57) ABSTRACT

A divert-air valve for a compressor of an internal combustion engine includes a flow housing with an inlet, an outlet, and a duct arranged therein, an actuator housing, an electromagnetic actuator with an armature arranged in the actuator housing, a control body which is moved by the electromagnetic actuator so as to close off the duct, a housing interior in which the armature moves, openings arranged in the control body, a connector housing arranged to bear axially against the electromagnetic actuator and to at least partially delimit the housing interior, a first sealing ring arranged on the connector housing, and a second sealing ring which bears against the flow housing on an axially opposite side of the connector housing. The openings fluidically connect the housing interior to the duct. The first sealing ring bears against the electromagnetic actuator.

14 Claims, 2 Drawing Sheets

(51) Int. Cl.
*F02M 35/10* (2006.01)
*F16K 31/06* (2006.01)

(52) U.S. Cl.
CPC ... *F02M 35/10255* (2013.01); *F16K 31/0655* (2013.01); *F16K 31/0675* (2013.01)

(58) Field of Classification Search
USPC .................................................. 251/129.07
See application file for complete search history.

(56) References Cited

U.S. PATENT DOCUMENTS

| | | | |
|---|---|---|---|
| 7,886,760 B2 | 2/2011 | Groschel et al. | |
| 8,387,383 B2 | 3/2013 | Thiery et al. | |
| 8,544,816 B2 | 10/2013 | Bielass | |
| 2004/0041114 A1 | 3/2004 | Hirata et al. | |
| 2007/0017587 A1 | 1/2007 | Groschel et al. | |
| 2009/0301081 A1 | 12/2009 | Thiery et al. | |
| 2013/0082199 A1 | 4/2013 | Matsumoto et al. | |
| 2013/0313455 A1 | 11/2013 | Bittner | |
| 2014/0084194 A1 | 3/2014 | Kibune | |
| 2016/0153351 A1* | 6/2016 | Turner | F02B 33/32 60/600 |

FOREIGN PATENT DOCUMENTS

| | | |
|---|---|---|
| DE | 10 2010 026 121 A1 | 1/2012 |
| DE | 10 2011 056 096 A1 | 6/2013 |
| DE | 10 2012 010 140 A1 | 11/2013 |
| DE | 10 2012 224 160 A1 | 6/2014 |
| EP | 1 655 465 A2 | 5/2006 |
| EP | 1 941 138 B1 | 3/2010 |
| EP | 2 405 167 A2 | 1/2012 |
| JP | 7-208631 A | 8/1995 |
| JP | 2003-269643 A | 9/2003 |
| JP | 2013-83339 A | 5/2013 |
| JP | 2014/066309 A | 4/2014 |
| KR | 10-2013-0035982 A | 4/2013 |
| KR | 10 2014 002 1978 A | 2/2014 |
| WO | WO 98/26168 A1 | 6/1998 |
| WO | WO 2007/048828 A1 | 5/2007 |
| WO | WO 2014/068765 A1 | 5/2014 |

* cited by examiner

OVERRUN AIR RECIRCULATION VALVE FOR A COMPRESSOR OF AN INTERNAL COMBUSTION ENGINE

CROSS REFERENCE TO PRIOR APPLICATIONS

This application is a U.S. National Phase application under 35 U.S.C. § 371 of International Application No. PCT/EP2015/066454, filed on Jul. 17, 2015 and which claims benefit to German Patent Application No. 10 2014 113 551.2, filed on Sep. 19, 2014. The International Application was published in German on Mar. 24, 2016 as WO 2016/041660 A1 under PCT Article 21(2).

FIELD

The present invention relates to a divert-air valve for a compressor of an internal combustion engine comprising a flow housing having an inlet and an outlet, an electromagnetic actuator arranged in an actuator housing, a control body which can be moved via the actuator, a housing interior in which an armature of the electromagnetic actuator is movable, openings in the control body, via which openings the housing interior is fluidically connected to a duct adapted to be closed off by the control body and arranged in the flow housing, and a connector housing which bears axially against the actuator and which at least partially delimits the housing interior.

BACKGROUND

Divert-air valves for the recirculation of compressed fresh gas, optionally with recirculated exhaust gas, from the pressure side of a compressor of a turbocharger back to the suction side of the compressor, have previously been described. The connection between the pressure side and the suction side of the compressor via a bypass line is required for the transition from a high load into the propulsion operation of the internal combustion engine to prevent a high conveyance of the booster pump against a closed throttle flap and the resultant pumping effect, and to prevent a sudden drop of the turbo speed which is too strong with resulting thermodynamic problems.

Divert-air valves are frequently operated electromagnetically, wherein the valve closure body of the valve is moved via the armature by the electromagnetic force and can be lowered onto a valve seat and be lifted off therefrom, the valve seat being arranged in a flow housing between an inlet and an outlet of the compressor. Very fast switching is required in these divert-air valves because of the rapidly changing load conditions of the compressor. Most divert-air valves are therefore designed for equalized pressure. This is accomplished by providing openings in the control body via which the pressure applied to the control body from below will be conducted into the interior of the valve, wherein the effective diameters on both axial sides of the control body are also selected to be equal. The control body will consequently be acted on only by the force of a spring that is effective in the closing direction and by the force of the electric magnet that is effective in the opening direction. Very short opening and closing times are achieved thereby, provided that the design has been correctly implemented.

Such a valve is described, for example, in EP 1 941 138 B1. The electromagnetic actuator of this divert-air valve is surrounded by a plastic housing which bears against a connection housing accommodating the control body in its interior. A groove is formed on the connection housing between these two housings, the groove being adapted to have a sealing ring placed therein so that no gas that is present in the interior can leak to the outside through the gap between the housings. The actuator housing, with interposition of a sealing ring, also bears against a flow housing in which the duct is formed that connects the inlet and the outlet of the compressor. Problematic in such a valve is, however, that the coil is not sufficiently protected from ingress of the gas conveyed by the compressor that contains contaminants and oil. This gas may happen to enter the coil along the armature between the sliding sleeve and the coil carrier and between the return plate and the coil carrier and, between the two housings, it may also axially intrude into the region between the two sealing rings. This will result in an increased risk of corrosion on the coil. The individual components also must be mounted, and a disturbing noise will be generated during the opening of the valve when the control body abuts against the actuator housing.

SUMMARY

An aspect of the present invention is to provide a divert-air valve wherein the coil is reliably protected from the ingress of gas along with the contaminants contained therein. An aspect of the present invention is also to provide a divert-air valve which has simple and an inexpensive design in order to reduce costs for production and assembly. The number of components that are to be assembled should be reduced therefor. The divert-air valve should also be switched with only a minimum of noise while still providing its functionality and fast opening and closing processes.

In an embodiment, the present invention provides a divert-air valve for a compressor of an internal combustion engine which includes a flow housing comprising an inlet, an outlet, and a duct arranged therein, an actuator housing, an electromagnetic actuator comprising an armature arranged in the actuator housing, a control body configured to be moved by the electromagnetic actuator so as to close off the duct, a housing interior in which the armature is configured to move, openings arranged in the control body, a connector housing arranged to bear axially against the electromagnetic actuator and configured to at least partially delimit the housing interior, a first sealing ring arranged on the connector housing, and a second sealing ring configured to bear against the flow housing on an axially opposite side of the connector housing. The openings are configured to fluidically connect the housing interior to the duct. The first sealing ring is configured to bear against the electromagnetic actuator.

BRIEF DESCRIPTION OF THE DRAWINGS

The present invention is described in greater detail below on the basis of embodiments and of the drawings in which.

DETAILED DESCRIPTION

Figure 1:
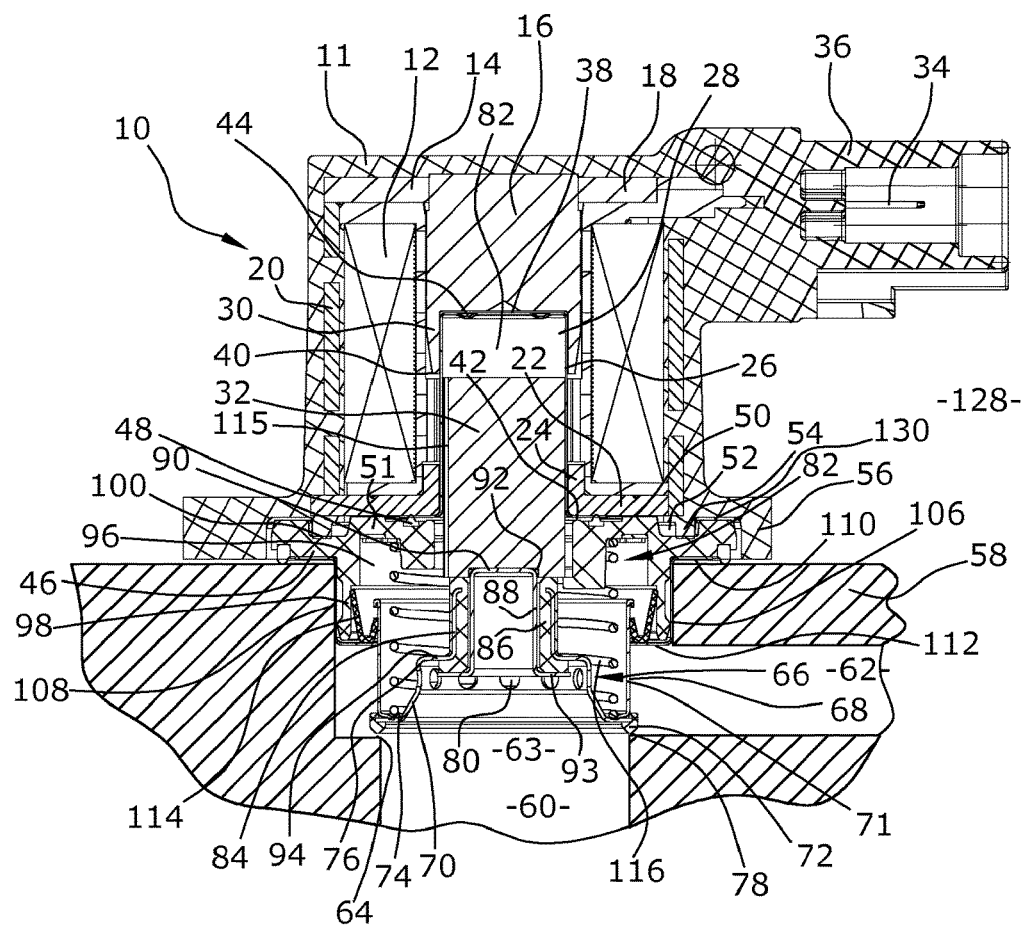
FIG. 1 shows a sectional lateral view of a divert-air valve according to the present invention.
Figure 2:
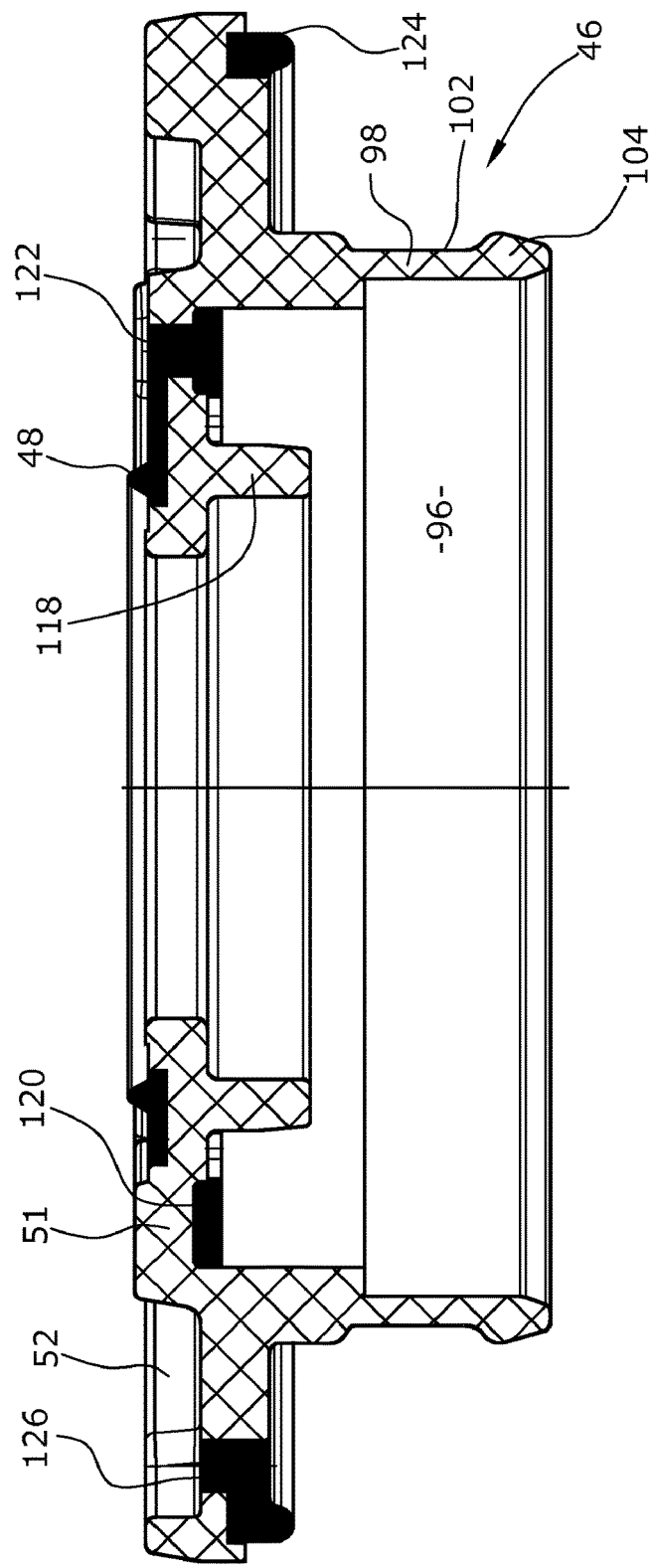
FIG. 2 shows a sectional lateral view of a connection housing of the divert-air valve according to the present invention.

Because the connector housing has a first sealing ring which bears against the actuator arranged thereon, and a second sealing ring which bears against the flow housing on the axially opposite side of the connector housing, it is neither possible for contaminated gas to reach either the coil or the exterior from the adjacent flow housing along the outer side of the valve, nor for this gas to reach the coil via the interior of the housing and the gap between the connection housing and the actuator. A good sealing effect for the coil is thus achieved in a simple manner.

In an embodiment of the present invention, the first sealing ring can, for example, be arranged within a radial extension of a return plate which is arranged at the end of the actuator facing toward the control body and is magnetically connected to a yoke of the actuator, and the second sealing ring can, for example, be arranged radially outside the control body. By the position of the first sealing ring, the gap is sealed before the joint between the yoke and the return plate so that an intrusion of gas into this joint is prevented. The second sealing ring is effective to seal a separating joint between the divert-air valve and the flow housing in this arrangement.

It can be advantageous if the first sealing ring bears against a collar of a guide sleeve delimiting the housing interior within the actuator housing. The abutting arrangement of the sealing ring on the guide sleeve prevents gas from the armature chamber from advancing in the direction of the coil, thereby providing a housing interior which is fully sealed toward the actuator.

In an embodiment of the present invention, an elastic plastic ring can, for example, be arranged on the axial side of the connection housing facing toward the control body, the diameter of the plastic ring corresponding to the diameter of the control body. The plastic ring serves as an abutment face for the control body in the opened state. The elasticity of the abutment dampens the abutment, thereby effecting a reduction of occurring noises and the mechanical stress on the connection housing and the control body.

A particularly cost-effective production is achieved if the sealing rings and/or the elastic plastic ring are attached to the connection housing by molding them into place. This additionally facilitates the assembly process by reducing the number of components to be assembled.

In an embodiment of the present invention, at least one connection duct, passing through the connection housing, can, for example, be formed between the first sealing ring and the elastic plastic ring. The liquid or pasty plastic can thereby be introduced from the axial side into both grooves for simultaneous generation of the plastic ring and the first sealing ring.

In an embodiment of the present invention, the connection housing with the sealings and/or the plastic ring can, for example, be a molded plastic part of a two-component type. A single component is thereby created in a simple and cost-effective manner, thereby obviating the need for further assembly steps.

It can be advantageous to produce the connection housing from a laser-light-permeable plastic and to weld the connection housing to the actuator housing by laser welding, whereby the laser welding seam is arranged radially between the two sealing rings. The entire valve can thereby be inserted as one piece into the flow housing. Ingress of liquid from outside in the direction of the coil is also prevented so that the coil of the divert-air valve is fully protected, both from the outside and from the inside, against intrusion of foreign substances.

In an embodiment of the present invention, a third sealing ring can, for example, be provided on the connection housing, the third sealing ring bearing against the actuator housing. The third sealing ring is also effective to seal the gap between the actuator housing and the connection housing in the direction of the coil so that no intrusion of liquids or other substances into the coil is possible from the outside.

It can be advantageous if the third sealing ring is integrally molded to the second sealing ring via an outer circumference of a base body of the connection housing. All sealing rings can correspondingly be inserted from one side.

In an embodiment of the present invention, the second sealing ring can, for example, extend via at least one through opening in the connection housing toward the axially opposite side of a base body of the connection housing. The sealing ring can be molded into place from the same side as the first sealing ring. The third sealing ring can also be produced integrally with the second sealing ring via the through opening being formed between the third sealing ring and the second sealing ring. These two sealing rings can then be inserted from the same side as the first sealing ring in the injection molding process.

It can be advantageous in this embodiment if, on the connection housing, there is formed an annular recess facing toward the actuator housing which has an annular projection of the actuator housing extending therein, wherein the laser welding seam or the third sealing ring are arranged between the recess and the projection. This facilitates the assembly process because the two housings of this design will be positioned radially relative to each other. The material section to be traversed by the laser is also kept short.

In an embodiment of the present invention, the base body of the connection housing can, for example, be provided with an annular projection extending axially in the direction of the control body which is radially surrounded by a spring which, in a biased state, is arranged axially between the base body and the control body. The spring serves to reset the control body onto the valve seat upon switch-off of the coil's supply voltage. The projection serves to positionally fix the spring in the control body. A further provision for fastening the spring is thus not required.

In an embodiment of the present invention, the connection housing can, for example, be provided with an annular housing wall which extends axially in the direction of the control body, wherein the housing wall is radially surrounded by a support ring having a sealing arranged thereon which bears radially inside against the control body and which bears radially outside against the housing wall. The housing wall serves to delimit the housing interior and is sealed by the sealing so that a pressure compensation is effected between the top side and the bottom side of the control body.

To make it possible to fasten the support ring to the connection housing in the most simple manner without the need to mount further fastening elements, the housing wall comprises a constriction in the region surrounding the sealing, and a radially widened portion on the axial end facing away from the actuator housing, wherein the radially widened portion has the support ring clamped thereto. The housing wall can thus be deformed in a slightly resilient manner, which allows the support ring to be shifted into position and to be held in this position with the aid of the widened portion.

The present invention thus provides a divert-air valve for use in a compressor of an internal combustion engine which has both a high sealing tightness of the coil against intrusion of media from inside or outside and is operable with a low noise level. The divert-air valve of the present invention will work with little noise and can be produced and mounted in an inexpensive manner. A safe pressure compensation for fast opening and closing of the valve is also provided.

An embodiment of a divert-air valve according to the present invention, provided for a compressor of an internal combustion engine, is illustrated in the drawings and will be described hereunder.

The divert-air valve according to the present invention as shown in FIG. 1 comprises an electromagnetic actuator 10 having an actuator housing 11 in which a coil 12 is arranged on a coil carrier 14. In the radially inner region of coil carrier 14 there is fastened a magnetizable core 16 whose axial end extends beyond coil carrier 14 wherein, on the axial end, the core 16 is surrounded by a first return plate 18 which is arranged in connection with a yoke 20 surrounding coil 12. A second return plate 22 is arranged on the end of coil carrier 14 opposite core 16 which in the radially outer region is in contact with yoke 20 and which comprises an inner axial extension portion 24 extending into coil carrier 14.

A guide sleeve 26 is arranged in the radial interior of inner axial extension portion 24 that extends all the way until entering a central recess 28 of core 16 which is surrounded by a radially outer and axially extending annular projection 30 of core 16 and in which an armature 32 is supported. The coil 12 is supplied with power via conduits 34 entering a plug 36.

Guide sleeve 26 comprises an open side having the armature 32 extending therein, and a closed side closed by a bottom 38 wherein, from bottom 38, a cylindrical wall surface 40 extends in the radially outer region that serves as a support surface during the movement of armature 32. An annular collar 42 extends radially outward from the open axial end of guide sleeve 26 opposite bottom 38. Bottom 38 is formed as a flat surface comprising an annular bulge 44 arranged symmetrically to the central axis, the annular bulge 44 facing toward the interior of guide sleeve 26 and serving as an abutment for the armature 32 in the powered state.

On the side facing away from core 16, the collar 42 of guide sleeve 26 axially bears against the flat side of the second return plate 22, which flat side extends in the direction of yoke 20. The collar 42 and, along therewith, the entire guide sleeve 26, is pressed against second return plate 22 via a connection housing 46 with interposition of a first sealing ring 48 of an elastomer, wherein the first sealing ring 48 is elastically deformed so that a gap between second return plate 22 and connection housing 46 is sealed toward the outside. First sealing ring 48 is molded to connection housing 46 by a two-component injection molding process.

On its substantially plate-shaped base body 51 by which the connection housing 46 bears against the actuator housing 11, the connection housing 46 comprises an annular recess 52 into which there extends an annular projection 54 of actuator housing 11 facing toward connection housing 46. Annular projection 54 has a diameter that is slightly larger than the outer diameter of the return plates 18, 22. A radially farther outward annular projection 56 of actuator housing 11 is arranged to grip around the base body 51 of connection housing 46 and serves for attachment of the divert-air valve to a flow housing 58 in which there is formed a duct 63 connecting an inlet 60 to an outlet 62, wherein a valve seat 64, surrounding duct 63, is formed in the flow housing between inlet 60 and outlet 62 while, in the closed state of the valve, a control body 66 rests on valve seat 64 to control a through-flow cross section of duct 63.

Control body 66 comprises a first hollow body 68 and a second hollow body 70 which is arranged in the radial interior of the first hollow body 68. The first hollow body 68 comprises a cylindrical outer surface 71 which is closed along its circumference wherein, on the end of the cylindrical outer surface 71 facing away from armature 32, an annular plate 72 is formed that extends radially inward. Second hollow body 70 comprises a radially outer annular plate 74 which is fastened to annular plate 72 by welding and from whose inner periphery an outer surface 76 extends into the interior region of the first hollow body 68. A sealing ring 78 is fastened by molding in the radially outer region of the radially outer annular plate 74 of second hollow body 70 whose effective diameter for placement on the valve seat 64 corresponds to the diameter of the cylindrical outer face of first hollow body 68.

Ten openings 80 are formed in the outer surface 76 of second hollow body 70 via which the inlet 60 of flow housing 58 is continuously fluidically connected to a housing interior 82 which is delimited by a first hollow body 68, the connection housing 46, and the guide sleeve 26, so that the cross-sectional area which is acted on by the pressure in the housing interior 82 in the closing direction of the divert-air valve is equal to the cross sectional area of the control body 66 which, at the inlet side, is acted on by the pressure in the opening direction of the divert-air valve.

A cylindrical portion 84 of second hollow body 70 facing toward the armature 32 has an elastomer 86 molded around it which bears against the armature 32. To fasten the control body 66 to the armature 32, use is made of a connection element 88 which is substantially pot-shaped and whose bottom 90 is fastened by welding in a central circular recess 92 on the axial end of armature 32. Connection element 88 is arranged substantially radially within the elastomer 86 and, on the side opposite to bottom 90, comprises a radially widened portion 93 which bears axially against elastomer 86 whose axially opposite end bears against a constriction 94 of second hollow body 70 so that the second hollow body 70 and, along therewith, the first hollow body 68, is fastened to the armature 32 so as to be movable together with the armature 32.

In connection housing 46, a chamber 96 is formed into which the control body 66 can be immersed upon actuation of the valve. Chamber 96 is radially delimited by an axially extending annular housing wall 98 of connection housing 46, housing wall 98 being arranged radially within the annular recess 52, and, axially to the actuator housing 11, is delimited by the base body 51. Connection housing 46 is made of a laser-light-permeable material so that, in the region of annular recess 52, the connection housing 46 can be fastened to actuator housing 11 by a surrounding laser welding seam 100.

The housing wall 98 comprises, on its radial outer side, an annular radial constriction 102 which, on the end axially facing away from actuator housing 11, is followed by a widened portion 104. Housing wall 98 is radially surrounded by a support ring 106 whose cylinder wall 108 tightly bears against widened portion 104. In this arrangement, the constriction 102 serves to allow for a slight resilient deformation of housing wall 98 in this region so that a clamping force is exerted on the support ring 106 via widened portion 104. On the end facing toward actuator housing 11, the cylinder wall 108 of support ring 106 is followed by an annular plate 110 facing radially outward which bears tightly on the base body 51 of connection housing 46. On the opposite axial end, support ring 106 comprises an annular plate 112 which faces radially inward and which has a diameter which is slightly larger than the outer diameter of control body 66. A sealing 114 having a V-shaped cross section and comprising two legs is supported on annular plate 112, wherein the first leg bears against the circumferentially closed outer surface 71 of control body 66, and the second leg bears against the radially limiting housing wall 98 so that, in the closed state of the valve, the chamber 96 is exclusively connected to the inlet 60 via the openings 80.

One or a plurality of axially extending grooves 115 are formed on the outer circumference of armature 32 to supply pressure from inlet 60 also to the part of the housing interior 82 (delimited by guide sleeve 26) between armature 32 and core 16 and thus to provide a pressure-compensated valve.

A helical spring 116 is arranged in the interior of the first hollow body 68 to further provide that the control body 66 is placed into a state resting on valve seat 64 in a non-powered powered condition of coil 12, wherein helical spring 116 rests in a tensioned state against annular plate 72 of first hollow body 68 and, by its opposite axial end, bears against base body 51 of connection housing 46. Helical spring 116 is held radially in position by an annular projection 118 of connection housing 46 that extends axially in the direction of control body 66. Annular projection 118 is provided with an outer diameter which is slightly smaller than the inner diameter of helical spring 116 for this purpose.

In the region surrounding helical spring 116, which region is arranged axially opposite to the outer surface 71 of control body 66, the base body 51 of connection housing 46 has provided on it an elastic plastic ring 120 facing toward control body 66, elastic plastic ring 120 being made of the same material as the first sealing ring 48. Elastic plastic ring 120 serves as an abutment for control body 66 when control body 66 is being displaced into the open state, and will dampen its movement and accordingly also the resultant noise. Elastic plastic ring 120 is connected to the first sealing ring 48 via a total of five connection ducts 122 which axially pass through base body 51, and accordingly, in one manufacturing step, is injection-molded together with the first sealing ring 48 from the side of the first sealing ring 48. The number of connection ducts 122 that must be provided thereby depends on the flowability of the plastic and on existing construction. The connection ducts can also extend obliquely or at least partially radially if the plastic rings to be attached by molding have different diameters.

The present invention provides that, from the same axial side of base body 51, a second sealing ring 124, which is arranged in the radial outer region of base body 51, is also injection-molded via five through openings 126 in base body 51. Second sealing ring 124 thus faces toward the flow housing 58 and, when the valve is being fastened to the flow housing 58, will be deformed via actuator housing 11 in an elastically sealing manner. The same indications that have already been rendered for the connection ducts herein apply concerning the number and position of the through openings.

Via two sealing rings 48,124 at the connection housing 46, it is effected in a simple manner that the housing interior 82 is sealed toward the outside and that, at the same time, intrusion of gases or liquids from an outer chamber 128 into the actuator 10 of the valve is prevented.

The gas (contaminated and including oil droplets) intruding from the inlet 80 via the openings 80 in control body 66 will enter the housing interior 82 delimited by connection housing 46 and guide sleeve 26 and first hollow body 68. The gap between the first hollow body 68 and the connection housing is sealed by the V-shaped sealing 114, and the gap 50 between guide sleeve 26 and connection housing 46 is sealed by the first sealing ring 48. No gas can thus intrude through the gap 50 along the second return plate 22 between the second return plate 22 and the yoke 20 in the direction of coil 12, thereby reliably protecting the coil from corrosion.

The second sealing ring 124 also provides that no gas can leak from the flow housing 58 into the outer chamber 128. The laser welding seam 100 is also effective to prevent that gas, by passing from outer chamber 128 via a gap 130 between actuator housing 11 and connection housing 46, might enter the actuator 10 and thus reach the coil 12.

There is thus provided a leak-tight valve which, by use of the connection housing 46 according to the present invention, can be easily assembled and in its assembled state can be fastened on the flow housing 58.

It should be evident that the scope of protection of the present invention is not limited to the described exemplary embodiment. It is in particular possible, for example, to use, instead of the laser welding seam, an additional sealing ring (again applied by a two-component injection molding process) for effecting a sealing against contamination intruding from the outside, or to perform an ultrasonic welding process. Such an ultrasonic welding can in particular be produced integrally with the second sealing ring by connecting the two sealing rings to each other via the outer circumference of the base body. The sealing rings can also be mounted as separate rings. The connection ducts or through openings for unilateral supply of the material for producing the sealing ring can also be formed obliquely in the base body or to extend partially radially, depending on given application. The number is also dependent on the flowability of the plastics used and on the given construction. Reference should also be had to the appended claims.

What is claimed is:

1. A divert-air valve for a compressor of an internal combustion engine, the divert air valve comprising:
   a flow housing comprising an inlet, an outlet, and a duct arranged therein;
   an actuator housing;
   an electromagnetic actuator comprising an armature arranged in the actuator housing;
   a control body configured to be moved by the electromagnetic actuator so as to close off the duct;
   a connection housing arranged to bear axially against the electromagnetic actuator;
   a housing interior at least partially delimited by the connection housing and by the actuator housing, the housing interior being configured to have the armature move therein;
   openings arranged in the control body, the openings being configured to fluidically connect the housing interior to the duct;
   a first sealing ring arranged on the connection housing, the first sealing ring being configured to bear against the electromagnetic actuator;
   a second sealing ring configured to bear against the flow housing on an axially opposite side of the connection housing; and
   an elastic plastic ring arranged on an axial side of the connection housing facing toward the control body,
   wherein,
   the elastic plastic ring comprises a diameter,
   the control body comprises a diameter, and
   the diameter of the elastic plastic ring corresponds to the diameter of the control body.

2. The divert-air valve as recited in claim 1, further comprising:
   a return plate comprising a radial extension, the return plate being arranged at an end of the electromagnetic actuator facing toward the control body,
   wherein,
   the electromagnetic actuator further comprises a yoke, the first sealing ring is arranged within the radial extension of the return plate and is magnetically connected to the yoke, and the second sealing ring is arranged radially outside the control body.

3. The divert-air valve as recited in claim 1, further comprising:

a guide sleeve comprising a collar, the guide sleeve being configured to delimit the housing interior within the actuator housing, wherein, the first sealing ring is further configured to bear onto the collar.

4. The divert-air valve as recited in claim 1, wherein at least one of the first sealing ring, the second sealing ring, and the elastic plastic ring are attached to the connection housing by molding the first sealing ring, the second sealing ring, and/or the elastic plastic ring into place.

5. The divert-air valve as recited in claim 1, further comprising:

at least one connection duct which is configured to axially traverse the connection housing, the at least one connection duct being formed between the first sealing ring and the elastic plastic ring.

6. The divert-air valve as recited in claim 1, wherein the connection housing and at least one of the first sealing ring, the second sealing ring, and the elastic plastic ring is provided as a molded plastic part of a two-component type.

7. The divert-air valve as recited in claim 6, wherein the connection housing is produced from a laser-light-permeable plastic and is welded to the actuator housing by a laser welding so that a laser welding seam is arranged radially between the first sealing ring and the second sealing ring.

8. The divert-air valve as recited in claim 7, further comprising:

a third sealing ring arranged on the connection housing, the third sealing ring being configured to bear against the actuator housing.

9. The divert-air valve as recited in claim 8, wherein, the connection housing further comprises an annular recess facing toward the actuator housing, the actuator housing comprises an annular projection which is configured to extend into the annular recess, and the laser welding seam or the third sealing ring are arranged between the annular recess and the annular projection.

10. The divert-air valve as recited in claim 9, further comprising:

a spring which, in a biased state, is arranged axially between the base body and the control body, wherein, the base body comprises a base body annular projection which extends axially in a direction of the control body, the base body annular projection being configured to be radially surrounded by the spring.

11. The divert-air valve as recited in claim 8, wherein, the connection housing comprises a base body, and the third sealing ring is integrally molded to the second sealing ring via an outer circumference of the base body.

12. The divert-air valve as recited in claim 11, wherein, the connection housing further comprises at least one through opening, and the second sealing ring is configured to extend via the at least one through opening toward an axially opposite side of the base body.

13. The divert-air valve as recited in claim 1, further comprising:

a support ring; and a seal arranged on the support ring, wherein, the connection housing further comprises an annular housing wall which extends axially in a direction of the control body, the seal is configured to bear radially inside against an outside of the control body and to bear radially outside against an inside of the annular housing wall, and the support ring is configured to radially surround an outside of the annular housing wall.

14. The divert-air valve as recited in claim 13, wherein, the annular housing wall comprises a constriction in a region surrounding the seal and a radially widened portion on an axial end facing away from the actuator housing, and the support ring is clamped to the radially widened portion.

\* \* \* \* \*